Patented Sept. 14, 1937

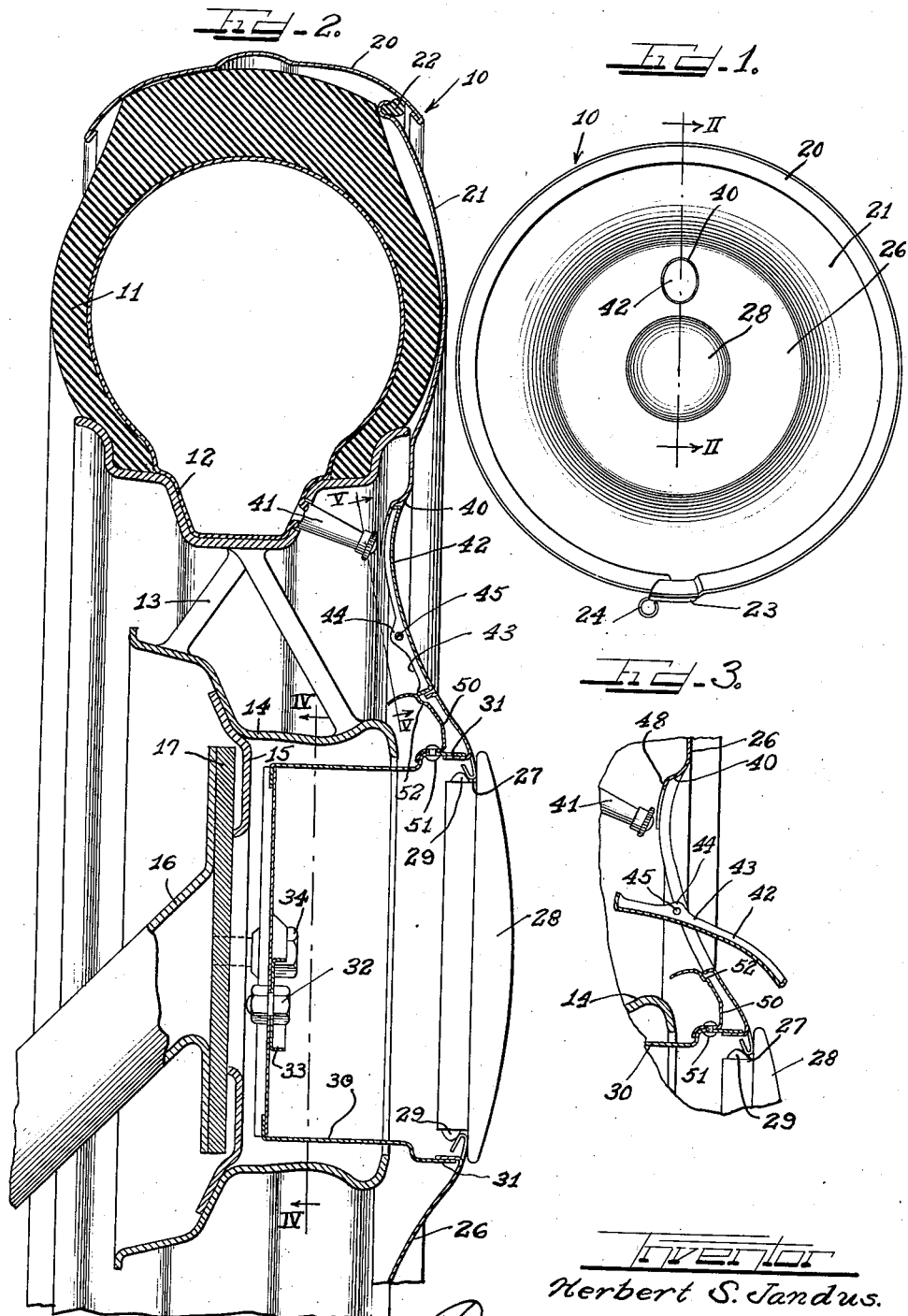

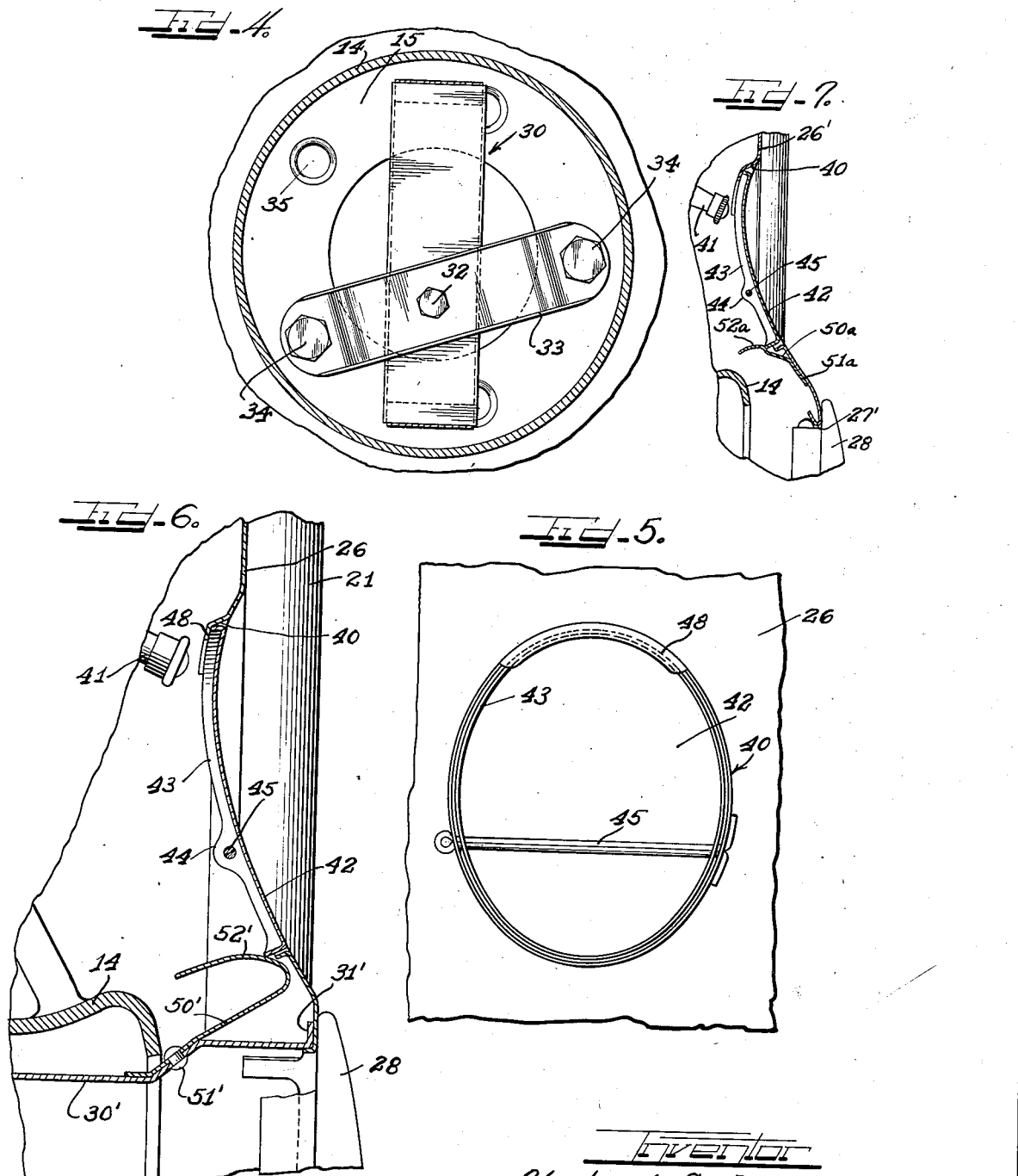

2,092,976

UNITED STATES PATENT OFFICE 2,092,976

TIRE AND VALVE STEM COVER STRUCTURE

Herbert S. Jandus, Detroit, Mich., assignor to Lyon Cover Company, Detroit, Mich., a corporation of Michigan Application November 9, 1934, Serial No. 752,254

7 Claims. (Cl. 150—54)

This invention relates to a tire and valve stem cover structure and more particularly to an improved spare wheel assembly, including a spare tire and wheel and a tire cover therefor.

An object of this invention is to provide an improved spare wheel assembly including a tire and wheel and a cover for the tire cooperable with the wheel for its retention in proper position on the tire.

Another object of this invention is to provide a simplified closure for a spare tire cover through the opening of which access may be had to the valve stem.

A further object of the invention relates to the provision of novel means for centering and securing the side portion of a spare tire cover in proper position on the tire.

In accordance with the general features of this invention, there is provided a spare tire cover including a side portion for disposition over an outer side wall of the tire and having a central portion over the space inside of the center of the tire, which central portion is provided with an opening through which access may be had to a valve stem; the opening being normally closed by a closure having a pivotal connection to the side portion, said connection being located nearer to one end of the closure than to the other, the closure being held shut by the spring means secured to the rear of the cover side portion for engaging the end of the closure to maintain the closure in its closed position but being so arranged that a slight inward pressure on this end of the closure will cause the closure to move inwardly over the spring means, thus exposing the valve stem behind the opening.

Another feature of the invention relates to the provision of novel means associated with the center of the cover side portion for securing the side portion inwardly of the wheel hub to a flange of the wheel usually employed to hold or otherwise secure the wheel in position on the support.

Other objects and features of this invention will more fully appear from the following detail description taken in connection with the accompanying drawings, which illustrate several embodiments of the invention, and in which Figure 1 is a side view of a spare tire structure embodying the features of this invention.

Figure 2 is an enlarged fragmentary sectional view taken on the line II—II of Figure 1 looking in the direction indicated by the arrows.

Figure 3 is a detail sectional view of the closure means associated with the valve stem and illustrating the closure means in its open position.

Figure 4 is a fragmentary sectional view taken on the line IV—IV of Figure 2 illustrating the means for securing the cover centrally of the wheel.

Figure 5 is a fragmentary view taken on the line V—V of Figure 2 looking at the rear of the valve stem opening closure.

Figure 6 is a sectional view similar to Figure 3 illustrating a modified form of spring means for holding the valve stem opening closure shut.

Figure 7 is a sectional view similar to Figure 3 illustrating a still further modification in the spring means.

As shown on the drawings:

The reference character 10 designates generally a spare tire cover which is illustrated as being of the type disclosed and claimed in United States Letters Patent No. 1,807,697 of George Albert Lyon. This spare tire cover is shown applied to a spare tire 11 of conventional construction mounted on a drop center rim 12 comprising one part of a wheel and which rim is connected by spokes 13 to another part of the wheel, namely the central hub 14. This wheel may be of any conventional or suitable construction and has a central flange 15 by means of which the wheel may be secured to a suitable support either on the axle of a vehicle or on a spare wheel carrier as illustrated. In Figure 2 the spare wheel is shown mounted upon a spare wheel carrier including a tube 16 which has one of its ends suitably mounted on the vehicle (not shown) in the usual way and has its other end provided with a flange 17 to which the wheel flange 15 is adapted to be secured.

The spare tire cover 10 as illustrated embodies a split tread covering portion or band 20 for disposition over the outer periphery of the tire 11 and a side portion 21 for disposition over an outer side wall of the spare tire. The split band 20 engages a rubber bead 22 on the outer periphery of the side portion or plate 21 for cooperation with this plate and to aid in retaining the plate on the tire in a manner fully disclosed in the aforesaid issued patent. The band is also illustrated as having one of its ends offset as shown at 23 in Figure 1 so that this offset end may overlap the other end of the flange. Also the offset end 23 is provided with an eye-shaped hook or ring by means of which the ring may be expanded off of the tire. As is fully disclosed in the aforesaid patent, this split ring or band has a tendency to contract to a diameter smaller than the diameter of the outermost periphery of the tire and in that way resiliently engages the tire and the outer margin of the side plate.

The side plate 21 includes a central portion 26 for disposition over the spokes 13 and the space between the rim 12 and the hub 14. This central portion 26 includes a central opening 27 in which is detachably disposed a conventional hub cap 28. This hub cap 28 has resilient elements 29 by means of which it may be yieldably retained in position in the center of the side plate. No further description of the hub cap is thought to be necessary since it is a conventional hub cap and is of the type which is adapted to be snapped into position in an opening such as in the hub of a spare wheel. The hub cap is removable whenever it is desired to get to the bolts inside of the wheel hub for securing the wheel to the supporting member.

At this time I wish to point out that while I have illustrated my invention as applied to a two-part tire cover, it is not limited to a tire cover of this construction but may be used with advantage in other types of the so-called drum covers now available on the market.

Secured to the rear side of the central portion 26 of the side plate is a U-shaped strap 30 which is disposed centrally of the spare wheel and cover so as to project inside of the wheel hub 14. The ends of the U-shaped strap 30 are suitably secured as by means of riveting, welding or the like, to the inner side of the central portion 26 of the side plate. In order to provide for the proper securement of each of these ends to the side plate, a finger or tang is punched from the edge of the side plate defining the opening 27 and is turned inwardly of the cover into a position in which it may be anchored to the end of the corresponding leg of the U-shaped strap 30 as indicated at 31.

The base of the U-shaped strap 30, as best shown in Figure 4, is secured by means of a single bolt 32 to an intermediate portion of a transverse fastening element 33, the ends of which are detachably secured by bolts 34 to the wheel flange 15 and the flange 17 of the supporting member 16. These two bolts extend through two of the openings in the wheel flange 15. These openings are illustrated in Figure 4 as being five in number and are designated generally by the reference numeral 35.

The bolts 34 extending through two of the openings in the wheel flange 15 not only serve to secure the fastening element 33 to the flange 15, but also serve to anchor the flange of the wheel to the flange 17 of the supporting member 16. By removing these bolts, the U-shaped strap 30 may be detached from the supporting member and from the wheel flange whereby the side plate of the tire cover may thereafter be removed from the spare tire and wheel.

In accordance with the features of my invention, I also provide the side portion 26 with a valve stem opening 40 through which access may be had to the conventional valve stem 41 of the spare tire. This valve stem opening 40 is adapted to be closed by a flap or hinged door-like closure 42 which is held in its closed position by means embodying my present invention. This hinged closure has an inwardly extending marginal skirt 43 provided with diametrically opposed pivot lugs 44 through which a hinge or pivot pin 45 extends. This pin 45 is illustrated as being in the form of a cotter pin and has its opposite ends projecting through openings in the flanged edge of the opening 40. This flanged edge is shaped to form a seat for the closure when it is in its shut position. Also the upper end of the flanged edge of the opening 40 is provided with an inwardly projecting extension 48 as best shown in Figures 3 and 5 which is adapted to serve as a stop or abutment for the closure when it is moved to its closed position.

It should be noted that the hinge or pivot pin 45 for the closure 42 is located nearer to the lower end of the closure than to the upper end so that the upper part of the closure is top heavy and will cause the closure to gravitate to an open position once the closure has been moved out of engagement with the spring means, as I shall now proceed to describe in detail.

I have in Figures 3, 6 and 7 illustrated three different forms of spring means for maintaining the closure in its closed position. In each of these forms, however, it should be noted that the spring means is in the form of a curved spring element which retains the closure or door in a closed position and is of such a shape that the closure may be opened by a slight pressure against the lower edge of the closure. This pressure against the lower edge of the closure will force it past the high point of the spring, and consequently the closure will remain open until forcibly closed by the exertion of pressure against its upper edge.

In Figures 3, 6 and 7, I have used the same reference numerals to indicate corresponding parts with the exception of the numerals employed to designate the spring element which in each of these figures is of a different construction.

In Figure 3 the spring element is illustrated as being in the form of an upwardly extending spring band 50 having its lower end secured by a rivet 51 to one leg of the strap 30. The free end of this spring element or band 50 is curved rearwardly as indicated at 52 so as to abut the lower edge of the closure 42 when the closure is in its closed position, as shown in Figure 2. This spring element exerts just enough pressure on the edge of the closure to maintain it shut, but the pressure is not great enough to prevent the closure from being opened when a slight pressure is exerted on the lower end of the closure to force this end inwardly over the free end 52 of the spring element 50.

In Figure 6 the spring element 50' has one end secured by a rivet 51' to a leg of the U-shaped strap 30' and has its other end turned back upon itself as indicated at 52' so as to yieldably engage the lower edge of the closure 42.

It should be noted that in this form of the invention each end of the strap 30' has a right-angle extension which is secured directly to the under side of the side portion of the cover as indicated at 31'.

In Figure 7 the central portion 26' of the side plate of the cover has a closure 42 which is of the same construction as that illustrated and described in Figures 2 and 3. The inner edge of the portion 26' is turned back upon itself at 27' to form an opening for the detachable hub cap 28. Secured directly to the rear side of the cover portion 26' is an inwardly extending spring band or element 50a which has one end riveted or otherwise secured at 51a to the side plate. The free end of this spring band or element is curved rearwardly as indicated at 52a into such a shape as to engage the lower edge of the closure 42 when it is in closed position and to exert a resilient closing pressure thereon.

Now while I have illustrated and described in detail the preferred forms of my invention, the invention is not to be thus limited but only insofar as defined by the scope and spirit of the appended claims.

I claim as my invention:

1. As an article of manufacture, a spare tire cover including a side portion for disposition over an outer side wall of a spare tire and having a central portion over a space inside of the center of the spare tire, said central portion being provided with an opening through which access may be had to the valve stem of the spare tire, a closure for said opening and having a pivotal connection to said central portion adjacent an end of the closure, and a spring element secured to the rear of said central portion for engaging said end of the closure to maintain the closure in its closed position and being so arranged that a slight inward pressure on said end of the closure will overcome the spring resistance and move the other closure end outwardly to expose the valve stem behind the opening.

2. The combination with a supporting member, a spare tire and wheel, including a central hollow hub having a flange for securement to the supporting member, of a spare tire cover including a side portion for disposition over a side wall of the tire and having centrally secured to it a rearwardly projecting strap, and a transverse element fastened to said strap inside of said hollow hub and detachably associated with said flange and supporting member, whereby to center the cover and to secure the cover in proper tire covering position.

3. The combination with a supporting member, a spare tire and wheel, including a central hollow hub having a flange for securement to the supporting member, of a spare tire cover including a side portion for disposition over a side wall of the tire and having centrally secured to it a rearwardly projecting strap, a transverse element fastened to said strap inside of said hollow hub and detachably associated with said flange and supporting member, said side portion having a central opening through which access may be had to said element to detach the same from the flange, and a removable closure cap in said opening for shielding said strap and element.

4. As an article of manufacture, a spare tire cover including a side portion for disposition over an outer side wall of a spare tire and having a central portion over a space inside of the center of the spare tire, said central portion being provided with an opening through which access may be had to the valve stem of the spare tire, and a closure for said opening and having a pivotal connection to said central portion adjacent an end of the closure, and a spring element secured to the rear of said central portion for engaging said end of the closure to maintain the closure in its closed position and being so arranged that a slight inward pressure on said end of the closure will overcome the spring resistance and move the other closure end to expose the valve stem behind the opening, said spring element having a curved free end arranged in the path of the swinging movement of the closure and being so formed that once the first end of the closure is moved over the same to open the closure, the closure will remain open until forcibly closed by the pressing of its other end inwardly toward the closure opening.

5. As an article of manufacture, a spare tire cover including a side portion for disposition over an outer side wall of a spare tire and having a central part over a space inside of the center of the spare tire, said central part being provided with an opening through which access may be had to the valve stem of the spare tire, and a closure for said opening and having a pivotal connection to said central part adjacent an end part of the closure, and a spring element secured to the cover in a position to engage said end part of the closure and maintain the closure in its closed position and being so arranged that a slight inward pressure on said end part of the closure will overcome the spring resistance and move the other closure end outwardly to expose the valve stem behind the opening.

6. As an article of manufacture, a spare tire cover including a side portion for disposition over an outer side wall of a spare tire and having a central part over a space inside of the center of the spare tire, said central part being provided with an opening through which access may be had to the valve stem of the spare tire, and a closure for said opening and having a pivotal connection to said central part adjacent an end part of the closure, and a spring element secured to the cover in a position to engage said end part of the closure and maintain the closure in its closed position and being so arranged that a slight inward pressure on said end part of the closure will overcome the spring resistance and move the other closure end outwardly to expose the valve stem behind the opening, said central part having a flange extending inwardly of said opening to form a seat and abutment for said other end of the closure.

7. In a side plate formed to cover substantially the entire outer side of a spare wheel and having an opening arranged so that it may be located substantially in front of the spare tire valve to render the same accessible from the front side of the plate without necessitating removal of the plate, a closure for said opening, means pivotally connecting said closure directly to said plate at said opening, and resilient means for yieldably holding the closure in closed position, said resilient means being mounted and arranged so that one end of the closure may be pushed in one direction relative to the plate against the resistance of said means to open position and then the other end of the closure may be pushed in the same direction relative to the plate against the resistance of said means to move the closure to closed position.

HERBERT S. JANDUS.